(12) United States Patent
Jenny

(10) Patent No.: US 7,810,636 B2
(45) Date of Patent: Oct. 12, 2010

(54) CONVEYOR CHAIN

(75) Inventor: Urs Jenny, Mollis (CH)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 12/470,111

(22) Filed: May 21, 2009

(65) Prior Publication Data

US 2009/0250326 A1 Oct. 8, 2009

Related U.S. Application Data

(62) Division of application No. 11/884,097, filed as application No. PCT/CH2006/000079 on Feb. 7, 2006, now Pat. No. 7,546,916.

(30) Foreign Application Priority Data

Feb. 10, 2005 (CH) .................................... 0226/05

(51) Int. Cl.
*B65G 15/02* (2006.01)
(52) U.S. Cl. ...................... 198/831; 198/850
(58) Field of Classification Search ................ 198/830, 198/831, 850, 852, 853, 832
See application file for complete search history.

(56) References Cited

U.S. PATENT DOCUMENTS

| | | | |
|---|---|---|---|
| 3,509,984 A | 5/1970 | Huffman et al. | |
| 4,216,845 A * | 8/1980 | Tashman et al. | ............ 198/831 |
| 4,438,842 A * | 3/1984 | Alldredge et al. | ............ 198/831 |
| 4,485,913 A | 12/1984 | Treiber | |
| 4,682,686 A * | 7/1987 | Ueda et al. | .................. 198/850 |
| 4,846,338 A | 7/1989 | Widmer et al. | |
| 4,883,160 A * | 11/1989 | Sansevero et al. | ............ 198/831 |
| 4,887,708 A | 12/1989 | Brown et al. | |
| 5,421,451 A | 6/1995 | Easton | |
| 5,988,362 A | 11/1999 | Nakamura et al. | |
| 6,629,596 B2 * | 10/2003 | Teuber | ....................... 198/850 |

FOREIGN PATENT DOCUMENTS

| | | | |
|---|---|---|---|
| CH | 657 827 A5 | 9/1986 | |
| DE | 34 21 413 A1 | 12/1985 | |
| DE | 38 26 953 A1 | 3/1990 | |
| DE | 198 05 204 A1 | 8/1999 | |
| EP | 0 818 404 A1 | 1/1998 | |
| JP | 3-158308 * | 7/1991 | ................. 198/850 |

OTHER PUBLICATIONS

International Search Report for PCT/CH2006/000079 dated Mar. 27, 2006 (in English and German).
Written Opinion for PCT/CH2006/000079 (in German) ISA/EP (undated).

* cited by examiner

*Primary Examiner*—James R Bidwell
(74) *Attorney, Agent, or Firm*—Harness, Dickey & Pierce, P.L.C.

(57) ABSTRACT

A conveyor chain has outer and inner first link plates which run on the same side of the conveyor chain and second outer and inner link plates which run on a second side of the conveyor chain, the second side being opposite the first side, wherein the outer first link plates have a larger area than the inner first link plates.

11 Claims, 9 Drawing Sheets

CONVEYOR CHAIN

CROSS REFERENCE TO RELATED APPLICATIONS

This application is a divisional patent application of U.S. Ser. No. 11/884,097 filed Aug. 9, 2007, which issued on Jun. 16, 2009 as U.S. Pat. No. 7,546,916 and is a National Phase application of PCT/CH2006/000079 filed Feb. 7, 2006, claiming priority to Switzerland Application No. 00226/05 filed Feb. 10, 2005, all of which are hereby incorporated by reference

TECHNICAL FIELD

The invention relates to a conveyor chain.

PRIOR ART

A generic curved band conveyor is known, for example, from CH-A-657827. It has a carrier stand which carries a conveying surface extending over a quarter circle. The conveying surface is formed by a band-shaped endlessly revolving conveyor belt which is guided in each case at both ends of the quarter circle via deflecting rollers. On the outside of the curve, the carrier stand has arranged on it a curved guide rail, in which a conveyor chain driven via a motor is guided. The conveyor band is connected via drivers to this conveyor chain and is moved by the latter in the conveying direction. The guide rail is screwed in the form of a curved plinth to individual vertical supports of the carrier stand. First crossmembers are fastened to the curve-inside cheek of the guide rail and are screwed with their second ends in each case to a curve-inside cheek of an inner plinth. These curved tracks have proved appropriate in practice. However, their mounting is complicated and requires a relatively large amount of fingertip feel, since the slightest dimensional deviation of the stand from an ideal quarter circle may lead to a fault during conveyance.

DE-A-34 21 413, DE-A-198 05 204, U.S. Pat. Nos. 4,887,708 and 5,988,362 also show curved band conveyors, the carrier stands of which have to be screwed together in a relatively complicated and time-consuming way.

-A-0 818 404 discloses a curved band conveyor with a tension device for the conveyor chain.

PRESENTATION OF THE INVENTION

An object of the invention is to provide an improved conveyor chain.

This object is achieved by a conveyor chain having outer and inner first link plates which run on the same side of the conveyor chain and second outer and inner link plates which run on a second side of the conveyor chain, the second side being opposite the first side, wherein the outer first link plates have a larger area than the inner first link plates.

This object is also achieved by a conveyor chain having first link plates arranged on a first side of the conveyor chain and second link plates arranged on a second side of the conveyor chain, the second side being opposite the first side, wherein the first link plates have a larger area than the second link plates.

The associated guide rail preferably has a correspondingly stepped groove. This arrangement increases the frictional surface and prevents the chain from unintentionally jumping out of its guide. The surface pressure above and below the link plate is approximately equal, so that the chain cannot be twisted. This reduces the risk of wear of the guide rail designed as a profile rail.

This asymmetric chain can be employed in different kinds of known conveyor tracks, in particular in those running in a straight line.

This chain is preferably but not exclusively used with a curved band conveyor comprising a carrier stand, at least one guide rail fastened to the carrier stand, a conveyor chain guided in the guide rail and a conveyor band movable by means of the conveyor chain along a conveying surface in the form of a sector of a circle. The carrier stand has an outer carrier frame, an inner carrier frame and radial struts. According to the invention, the radial struts can be connected in a pluggable way to the outer and inner carrier frame.

Preferably, for this purpose, there are connecting holes which are produced by means of laser cutting, by punching or by another dimensionally and positionally accurate machining method.

The outer and inner carrier frames ensure an exact positioning of the radial struts by virtue of the pluggable connection. This leads to an extremely accurate chassis or carrier stand at a low outlay in assembly terms. The outlay is further reduced or the positioning increased when the carrier frames, or at least one of these, have a carrier plate running horizontally.

By virtue of the predetermined dimensionally accurate connection points, the individual parts and, in particular, the guide rails for the upper and lower strand of the conveyor band can be positioned in a dimensionally accurate way as quickly as possible.

The assembly time is markedly shortened. Balancing and readjusting time is hardly required during assembly because of the dimensional stability. Moreover, the production of the individual carrier plates is cost-effective.

In a preferred embodiment, the assembly and maintenance of the conveyor chain are facilitated, since its chain tension can be set by means of a pneumatic spring. Since the pneumatic spring can have a spring follow-up, load shocks can be absorbed, so that they do not enter the chain. The wear of the chain is reduced. This type of chain tension can be employed not only in the abovementioned curved band conveyor according to the invention, but also in other known conveyor tracks, in particular even in those running in a straight line.

Further advantageous embodiments may be gathered from the dependent patent claims.

BRIEF DESCRIPTION OF THE DRAWINGS

The subject of the invention is explained below with reference to a preferred exemplary embodiment illustrated in the accompanying drawing in which.

WAYS OF IMPLEMENTING THE INVENTION

Figure 1:
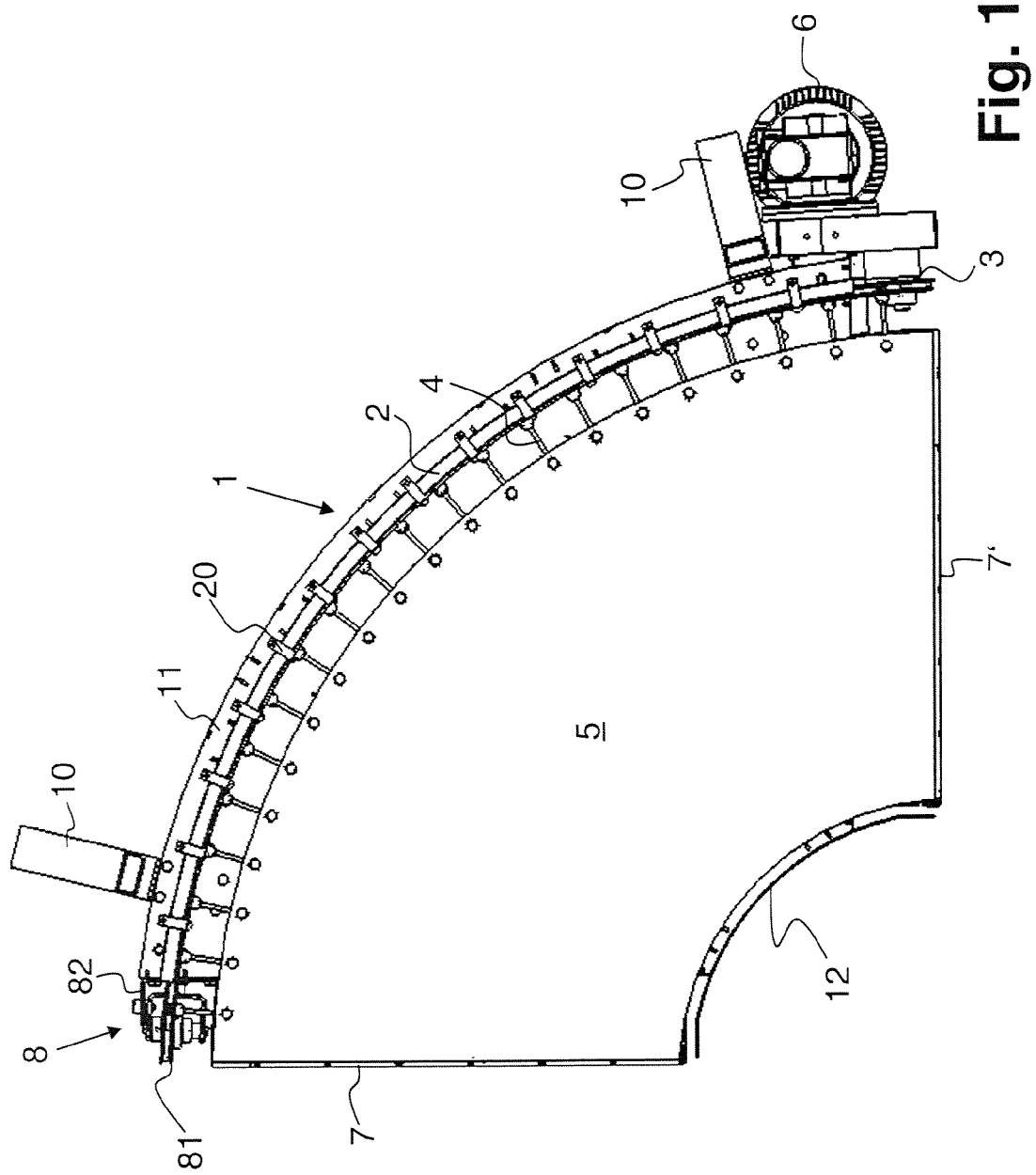
FIG. 1 shows a view of a curved band conveyor according to the invention from above, without a cover plate.

FIG. 1 illustrates a curved band conveyor according to the invention from above. It has a carrier stand 1 which, in this example, describes approximately a quarter circle. This form is preferred, but it is also possible that the conveyor or the conveying plane extends over a part circle of larger or smaller angle.

The carrier stand is preferably manufactured from metal, in particular from aluminum or steel.

The carrier stand 1 has vertical supports 10, to which a correspondingly curved outer carrier frame 11 running along the conveying plane is fastened. An inner carrier frame 12 runs concentrically with respect to the outer carrier frame 11.

Deflecting rollers 7, 7' are arranged at the start and end of the conveying distance and preferably extend in the radial direction. The conveying plane is preferably a horizontal flat plane, but it may also extend at an angle to the horizontal.

An upper and a lower guide rail 2, 2' are arranged on the carrier stand 1. Only the upper guide rail 2 can be seen in FIG. 1. An endlessly revolving conveyor chain 3 is guided and held displaceably in these guide rails 2, 2'. The conveyor chain 3 is driven by means of a drive motor 6. Furthermore, a tension device 8 may be present, in order to tension the conveyor chain 3.

Radially oriented drivers 4 are fastened with a first end to the conveyor chain 3 and with a second end to an endlessly revolving conveyor band or conveyor belt 5 of known type. The conveyor band 5 runs in the conveying plane and is subdivided by the deflecting rollers 7, 7' into an upper and a lower strand. The upper strand in this case defines the planar conveying surface.

Figure 2:
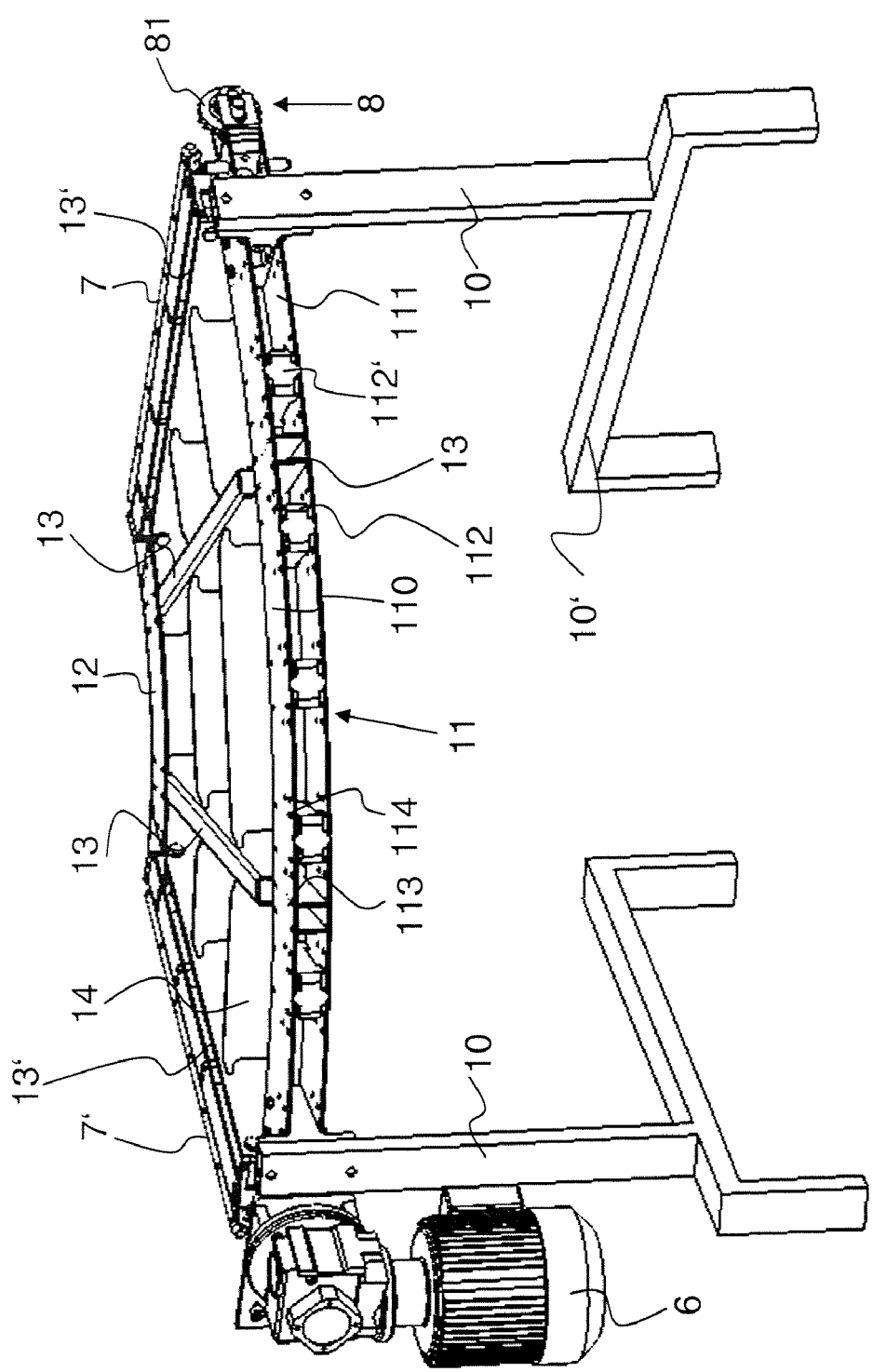
FIG. 2 shows a perspective view of a carrier stand of the curved band conveyor according to FIG. 1, without a guide rail and conveyor band.

The carrier stand 1 of the curved band conveyor according to the invention can be seen clearly from FIG. 2. The outer carrier frame 10 has a flat lower and a flat upper carrier plate 110, 111 which are both curved correspondingly to the conveying distance and run parallel to or in the conveying plane. Moreover, they are arranged so as to be spaced apart, but so as to run parallel to one another. The carrier plates 110, 111 may be screwed to the vertical supports 10 or be connected to these in a pluggable way. A pluggable connection, made once, is preferably fixed unreleasably or irreversibly, in particular by welding or by soldering.

The outer and the inner carrier frame 11, 12 are connected to one another via radial struts. These radial struts are formed at the start and end of the conveying distance by head part suspensions 13'. These head part suspensions 13' are preferably profile strips or flat strips. Between these head part suspensions 13', there are radially running transverse struts 13 which are likewise radial struts, preferably in the form of U-profiles. According to the invention, these radial struts 13, 13' are connected in a pluggable way to the outer and inner carrier frames 11, 12. This connection is preferably fixed irreversibly, for example by welding or soldering, during assembly. Irreversible fixing, in this context, means that the connection can be released only by the appropriate exertion of force.

The upper and the lower outer carrier plate 110, 111 have, for this purpose, first connecting holes 113. These holes 113 are already prefabricated during the assembly of the curved band conveyor. They are preferably produced, during the production of the plates 110, 111, by laser cutting, punching or another dimensionally accurate and positionally accurate machining method.

The carrier plates 110, 111 preferably have second connecting holes 114 which are prefabricated in the same way as the first ones. The second connecting holes 114 of the upper and the lower carrier plate 110, 111 are in alignment with one another and serve for the reception of corresponding pins or noses of vertically oriented ribs 112. These ribs 112 serve as spacers between the two carrier plates 110, 111 and at the same time give the outer carrier frame 11 stability. The ribs 112 may be designed as simple strips. Preferably, however, they are horizontal U-profiles, of which the web 112' connecting the two legs of the U are directed outward. The U-profile has at the corresponding locations projecting latching noses for the plug connection.

Figure 3:
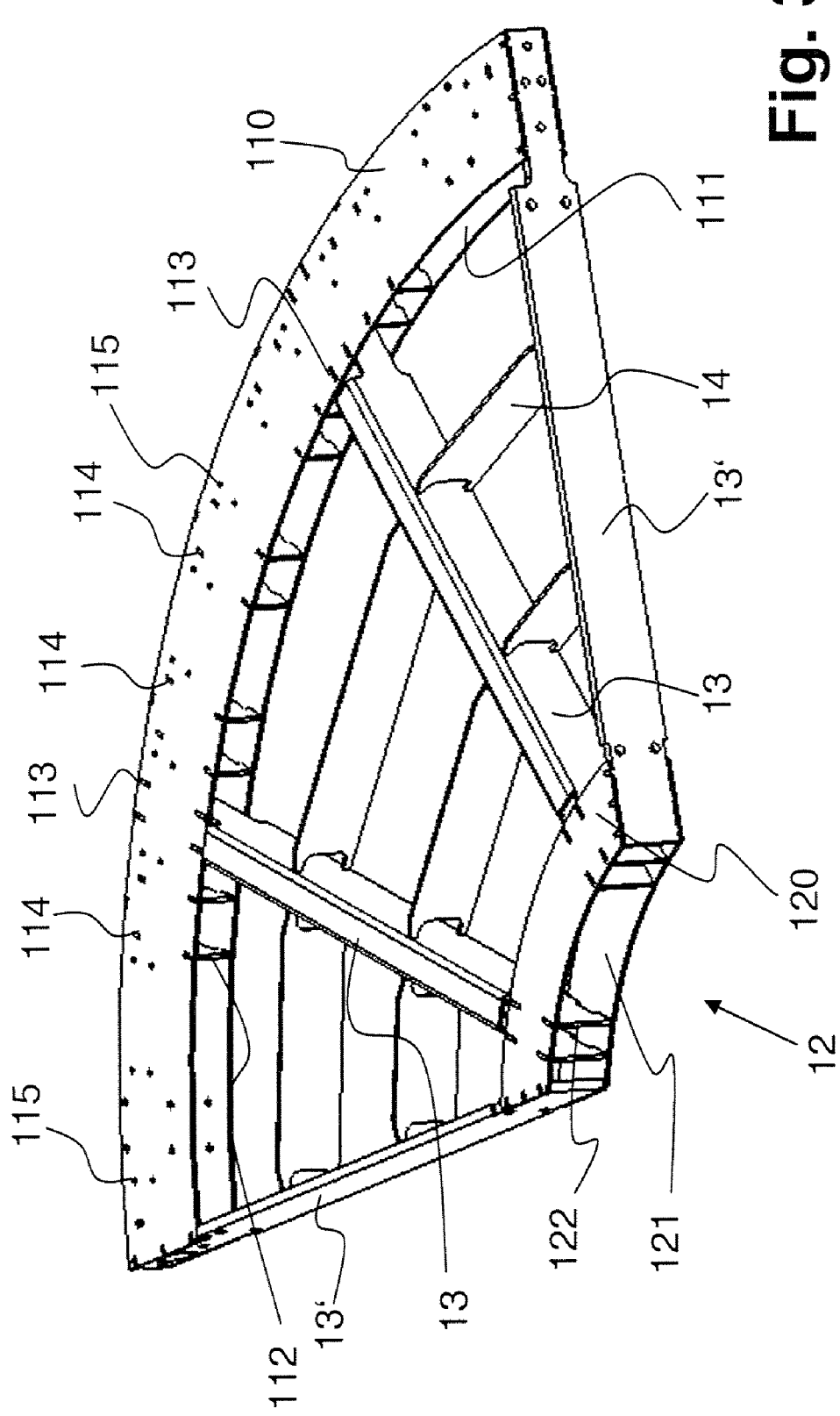
FIG. 3 shows a further perspective view of the carrier stand according to FIG. 2, without vertical supports and viewed from another side.

It can be seen from FIG. 3 that the inner carrier frame 12 preferably has the same construction and likewise has an upper and a lower carrier plate 120, 121 connected via webs or ribs. Here, too, the ribs 122 can be plugged into connecting holes of the plates 120, 121.

These ribs 112, 122 of the inner and outer carrier plates 110, 111, 120, 121 also are preferably fixed unreleasably, in particular by welding or soldering.

Furthermore, the crossmembers 13 may be spaced apart from one another via longitudinal struts 14. These longitudinal struts 14, too, can be fastened to the crossmembers 13 via plug connections. However, they can also simply be welded in between these in a conventional way without a plug connection.

Figure 4:
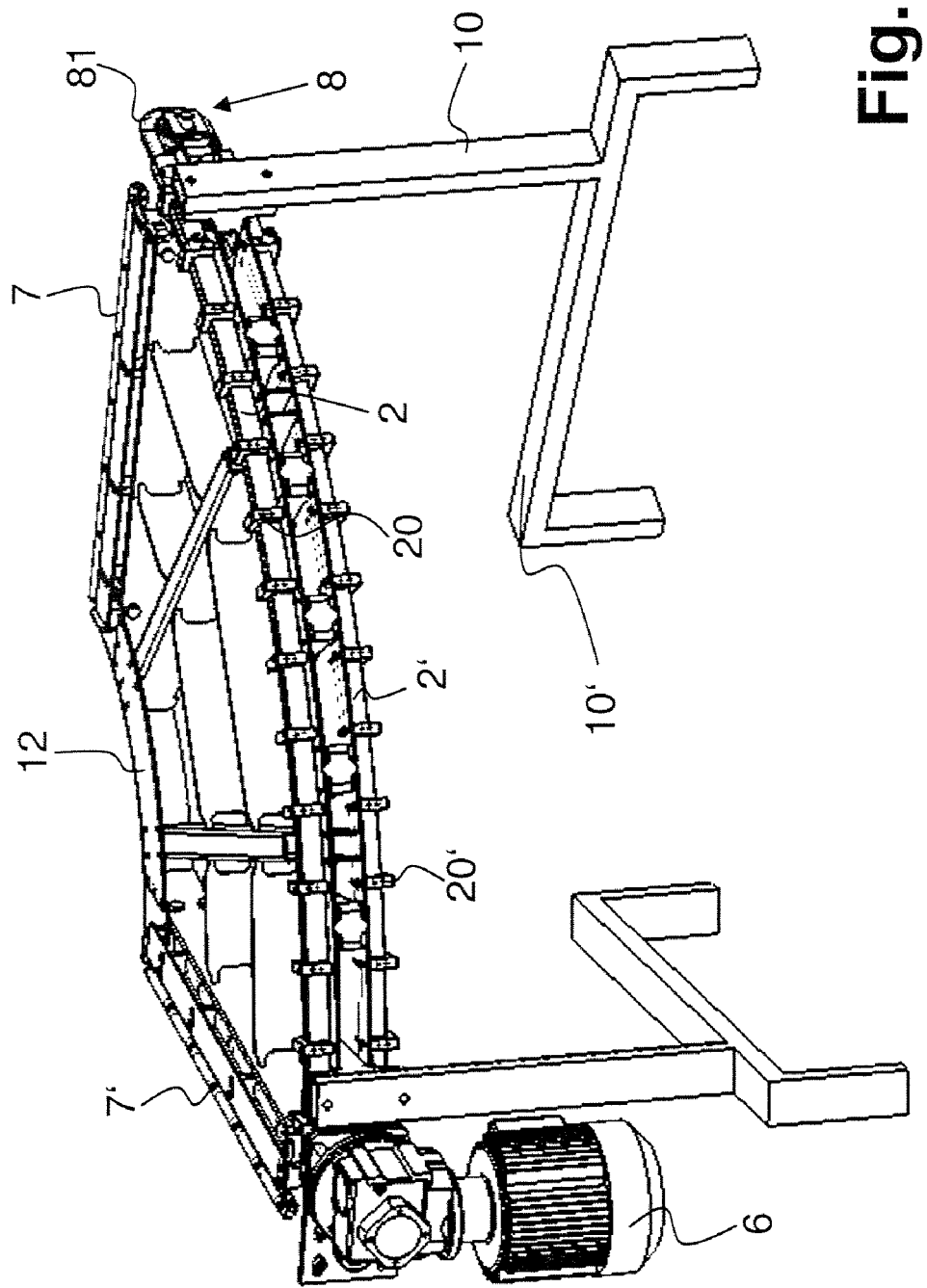
FIG. 4 shows a perspective view of the curved band conveyor according to FIG. 1 without a conveyor band and cover plate.

In can be seen in the illustration according to FIG. 4 that only the outer carrier frame 11 is fastened to vertical supports 10 and the inner carrier frame 12 is designed to be suspended freely. So that the carrier stand 1 stands in a stable way, the vertical supports 10 are provided with correspondingly long feet 10'. It is of course possible, however, also to fasten the inner carrier frame 12 to specific vertical supports 10.

Moreover, in this FIG. 4, the upper and the lower guide rail 2, 2' are arranged respectively on the upper and the lower outer horizontally running carrier plate 110, 111. The guide rails 2, 2' are in each case formed from a profile rail which is curved correspondingly to the curved track and which is designed to be open on one longitudinal side and closed on the other longitudinal side. The closed side is directed outward and the open side inward. The guide rails 2, 2' have, at regular intervals, holders 20, 20' which are fastened to the carrier plates 110, 111.

Figure 5:
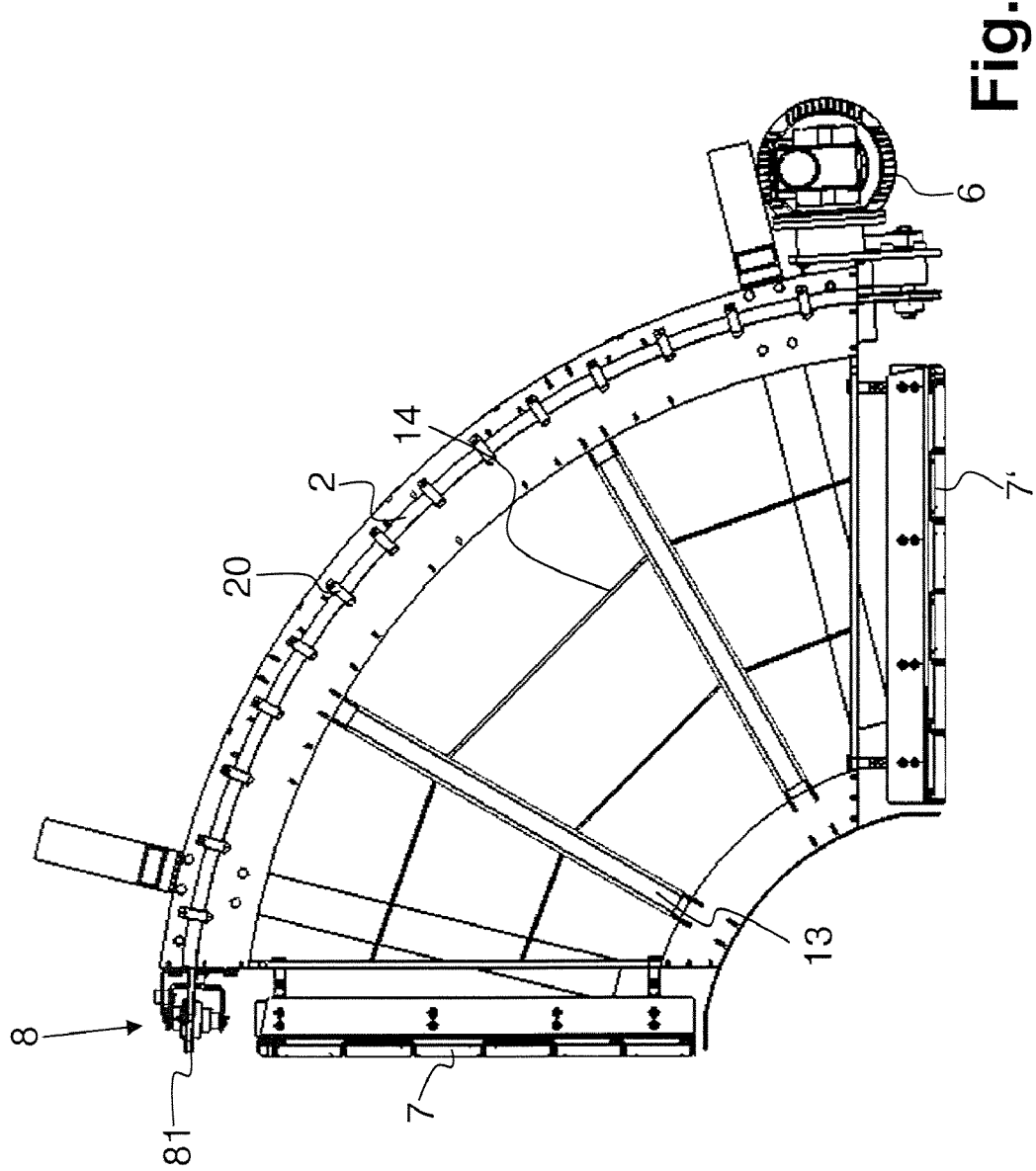
FIG. 5 shows a view of the curved band conveyor according to FIG. 4 from above.

They can be plugged on or, as illustrated here, screwed. Corresponding third connecting holes are designated by 115 in FIG. 3. FIG. 5 shows this arrangement in a view from above.

Figure 6:
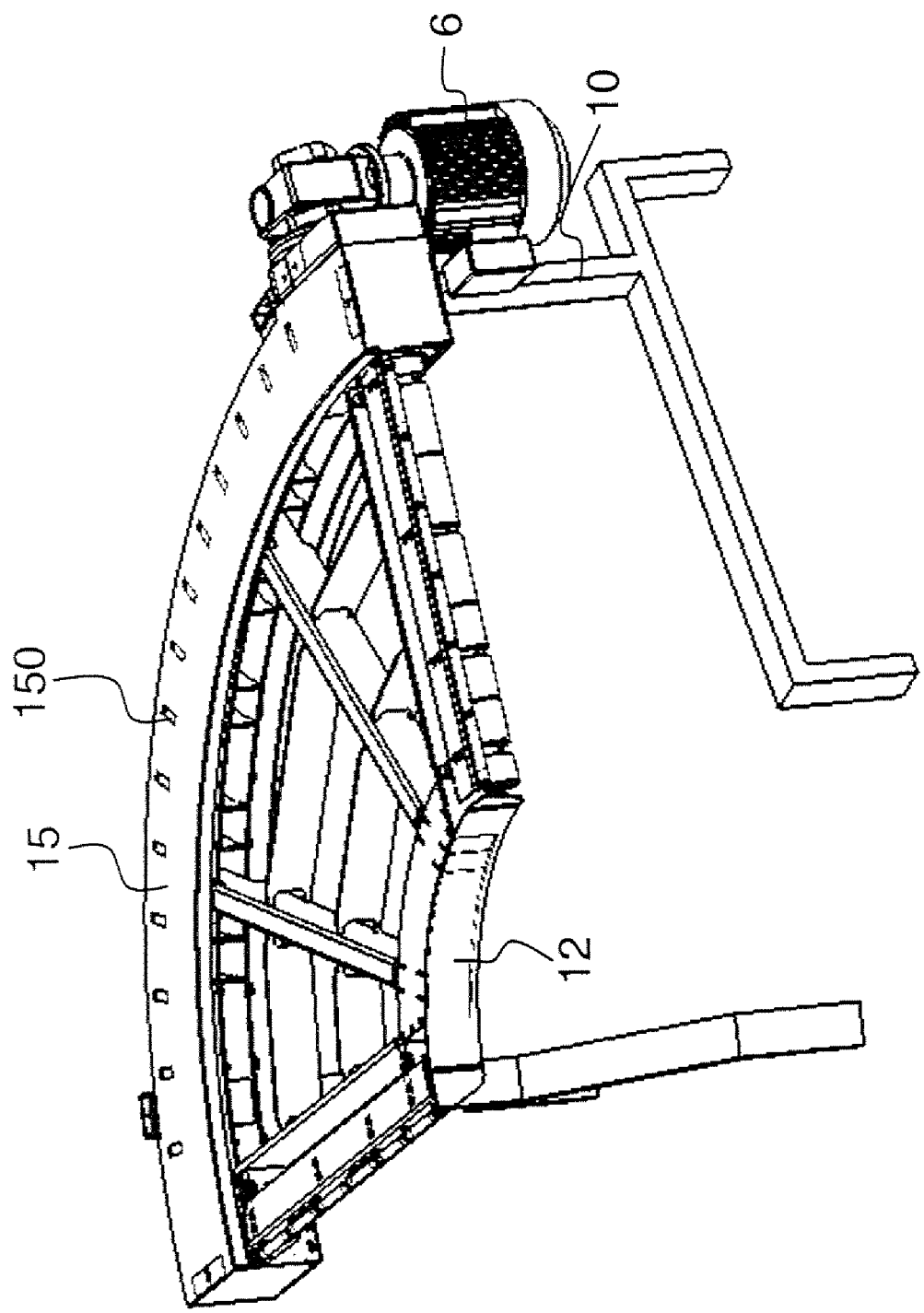
FIG. 6 shows a perspective view of the curved band conveyor according to FIG. 1 without a conveyor band, but with a cover plate.

At least the upper, preferably also the lower guide rail 2, 2' are covered by means of a cover plate 15 in order to avoid soiling. This can be seen in FIG. 6. The upper and the lower cover plate 15, in turn, are connected in a pluggable way to the upper and the lower carrier plate 110, 111 via ribs, not illustrated here. This connection is preferably reversibly releasable in order to make it easier to maintain the curved band conveyor.

Figure 7:
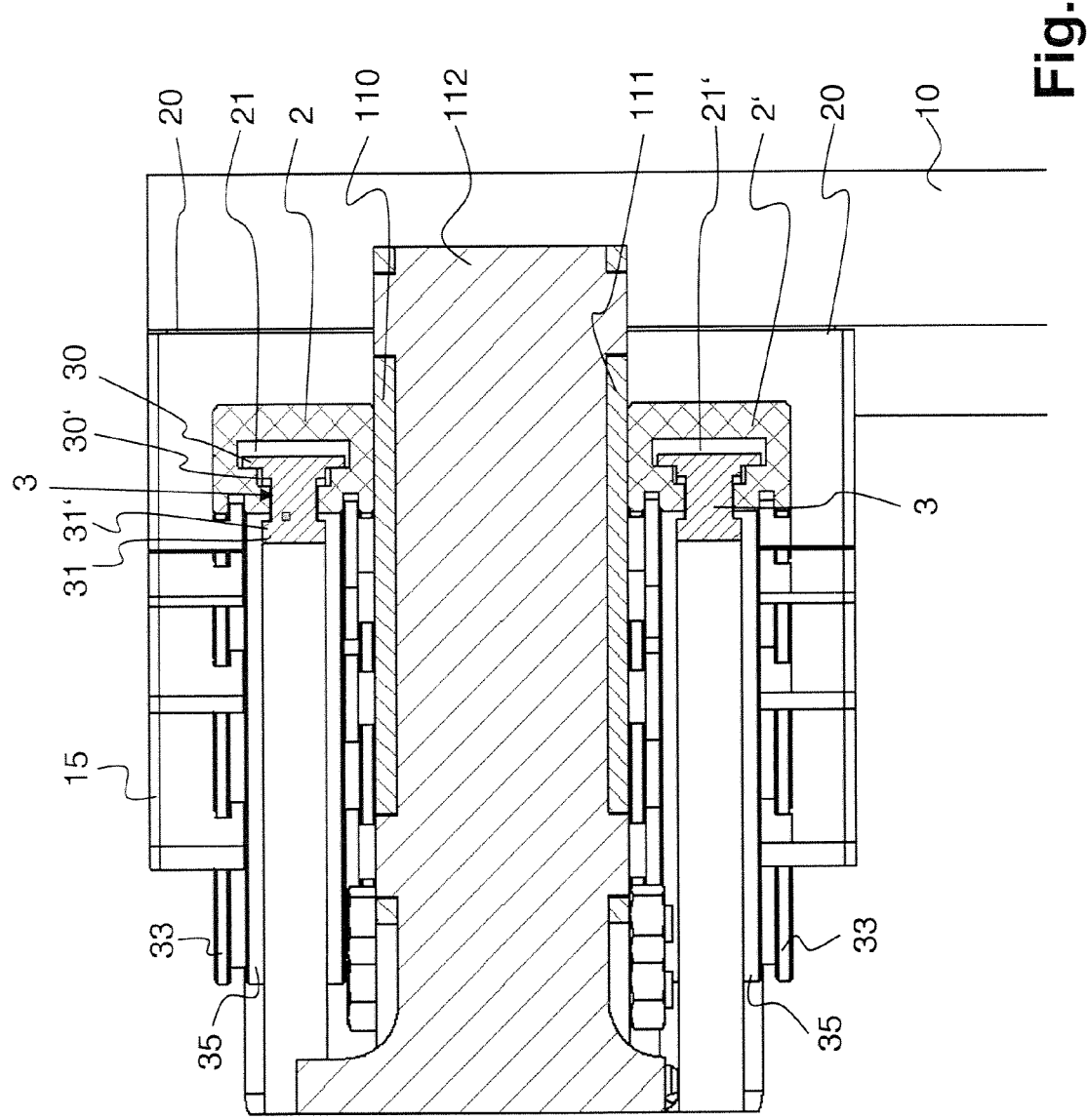
FIG. 7 shows a cross section through the curved band conveyor according to the invention, as shown in FIG. 6.

FIG. 7 shows a cross section through the carrier plates 110, 111, the ribs 112, the cover plates 15 and the guide rails 2, 2'. It can be seen here, then, how the conveyor chain 3 is held, guided in the guide rails 2, 2'. The upper strand of the endless conveyor chain 3 in this case runs in the upper guide rail 2 and the lower strand in the lower guide rail 2'. For this purpose, the guide rails 2, 2' have a groove 21, 21' which receives outer and inner first link plates 30, 30' of the conveyor chain 3.

Figure 8:
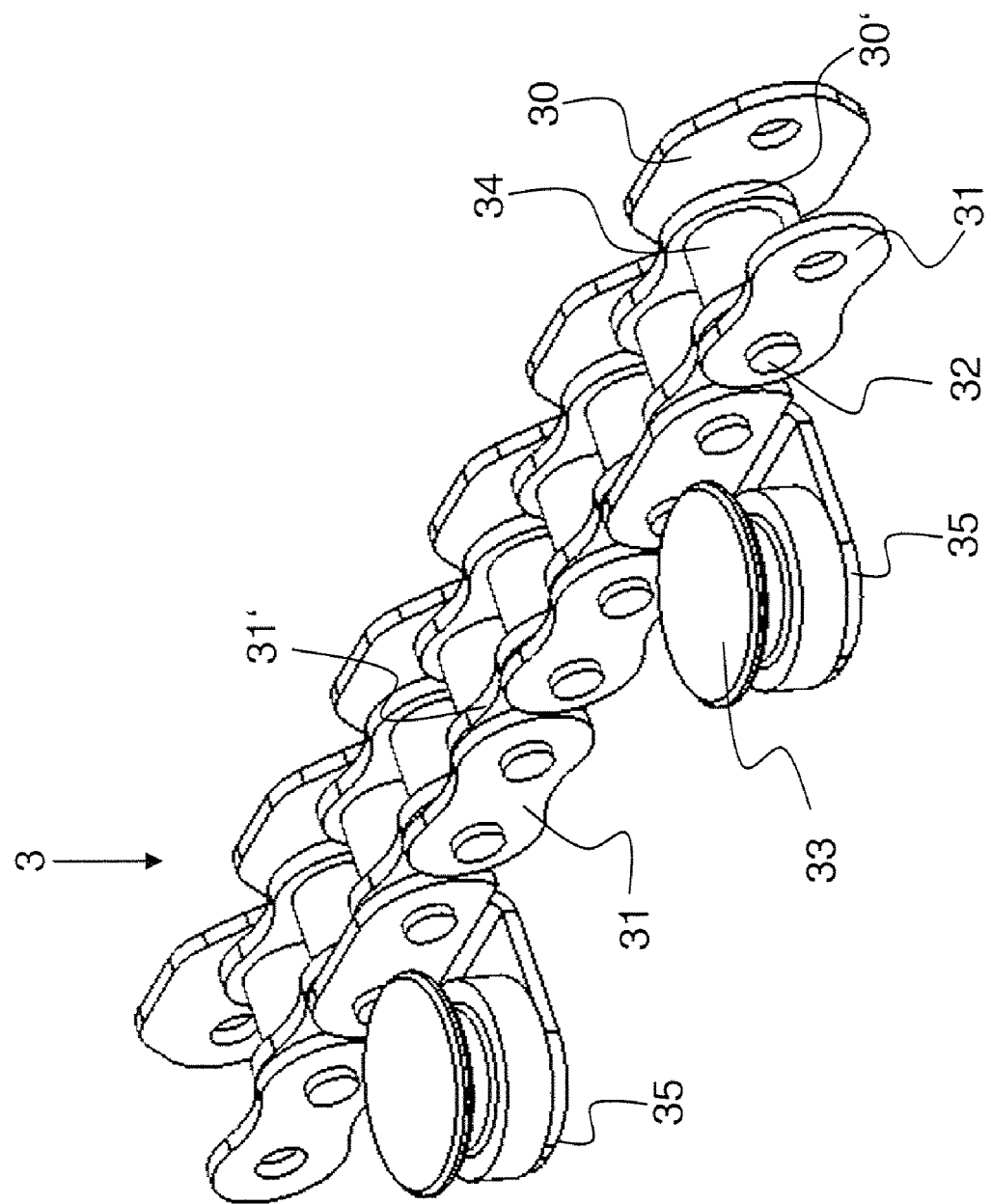
FIG. 8 shows a perspective view of a portion of a conveyor chain with a connecting yoke and driver head of the curved band conveyor according to the invention, as shown in FIG. 1.
Figure 9:
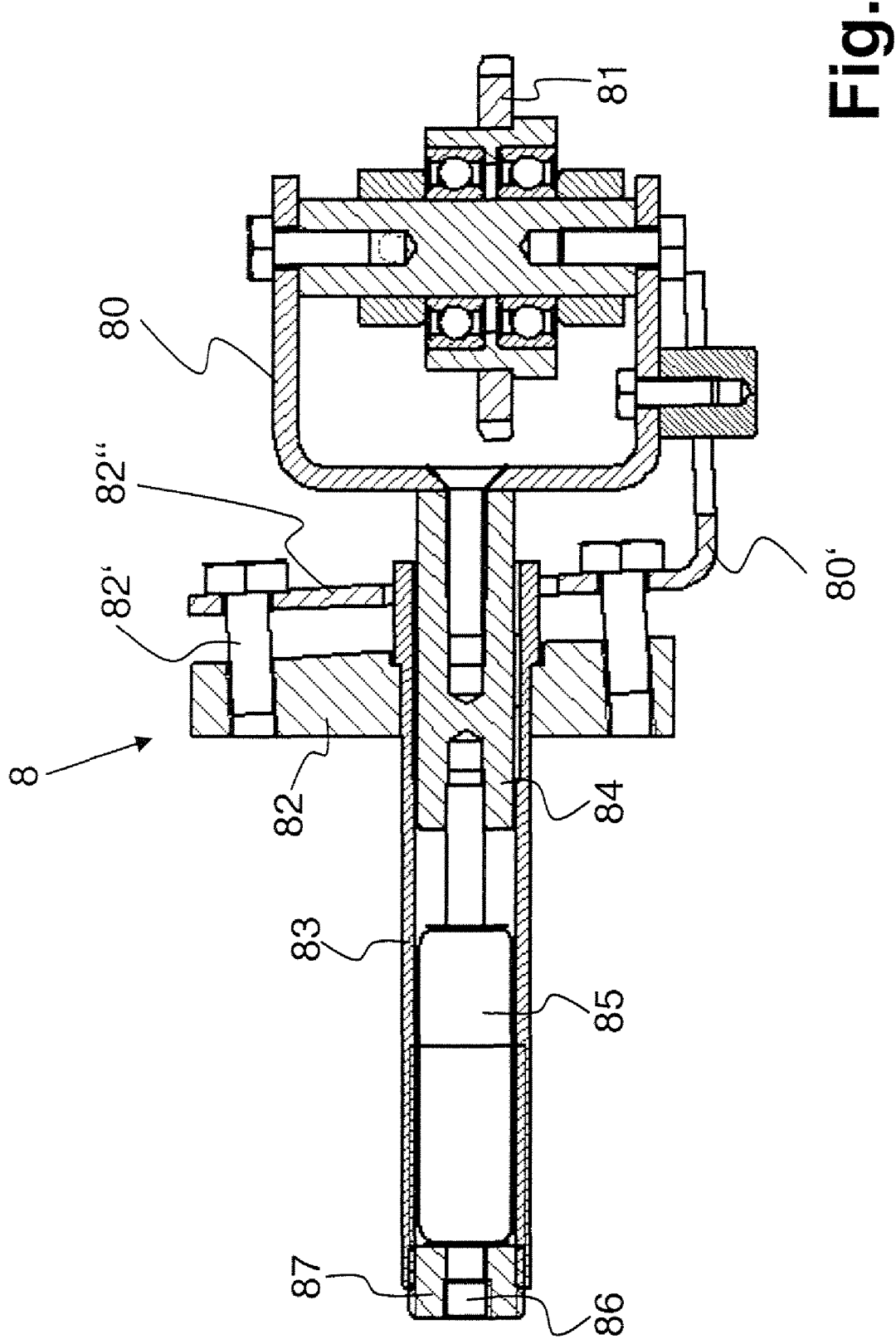
FIG. 9 shows a cross section through a chain tensioner of the curved band conveyor according to the invention, as shown in FIG. 1.

These link plates can be seen clearly in FIG. 8. The conveyor chain 3 is a link chain of a known type with first outer and inner link plates 30, 30' which are arranged on a first outer side of the conveyor chain 3, and with second outer and inner link plates 31, 31' which run on a second inner side of the conveyor chain 3. The link plates 30, 30', 31, 31' are connected to one another via connecting bolts 32, spacer sleeves 34 being present between the first and second inner link plates 30', 31'.

The first outer link plates 30, then, have a larger area than the first inner link plates 30'. Preferably, the remaining link plates 30', 31, 31' are designed identically, so that only the first outer link plates 30 are larger than the others, as illustrated in FIG. 8. The first outer and inner link plates 30, 30' are guided in the grooves 21, 21' of the guide rails 2, 2', these grooves 21, 21' being of correspondingly stepped design (see FIG. 7). The larger area of the outer link plates 30 therefore bears against the groove wall, so that a larger frictional and guide surface is obtained.

Connecting yokes 35 are integrally formed on part of the second outer link plates 31 and each carry a driver knob 33. The driver knob 33 has a peripheral groove. In each case a driver 4, not illustrated here, can be slipped over this driver knob 33 and held in the groove. The other end of the driver 4 is fixed to the conveyor band 5 by means of a rivet or screw connection or by means of other known types of fastening.

In order to maintain or set a tension sufficient for the conveyance of the conveyor chain 3, the chain tensioner 8 is preferably provided. This is fastened, preferably screwed, via a fastening plate 82 to one end of the conveying distance, preferably at its start, to the carrier stand 1. The fastening plate 82 has arranged on it via fastening screws 82' an intermediate yoke 82'' which carries a first leg of a U-shaped chain wheel holder 80. The chain wheel holder 80 carries a chain wheel 81. The endless conveyor chain 3 runs around this chain wheel 81 from the lower strand to the upper strand. The chain wheel holder 80 is held at its connecting web 80' in a shaft 84 by means of a screw. This shaft 84 runs within a tube 83 which passes through the fastening plate 82 and is held in the latter. At the other end of the shaft 84 is arranged a pneumatic spring which is likewise held in the tube 83. The position of the pneumatic spring can be set by means of a set screw 87 and a headless pin 86 displaceable therein. The position of the chain wheel holder 80 in relation to the fastening plate and therefore in relation to the carrier stand 1 can thus be set by means of the pneumatic spring 85 in a simple way, but in a highly directed manner.

The curved band conveyor according to the invention makes cost-effective, rapid and accurate assembly possible.

The invention claimed is:

1. A conveyor chain having outer and inner first link plates which each run on a first side of the conveyor chain and outer and inner second link plates which each run on a second side of the conveyor chain, the second side is opposite the first side, wherein the outer first link plates have a larger surface area than the inner first link plates, and wherein on part of the second outer link plates connecting yokes are integrally formed and configured for connection of the conveyor chain to a conveyor band.

2. A conveyor chain having first link plates arranged on a first side of the conveyor chain and second link plates arranged on a second side of the conveyor chain, the second side being opposite the first side, wherein the first link plates have a larger surface area than the second link plates, and wherein on part of the second link plates connecting yokes are integrally formed and configured for connection of the conveyor chain to a conveyor band.

3. The conveyor chain of claim 2 wherein the chain comprises outer and inner first link plates which run on the same side of the conveyor chain, wherein the outer first link plates have a larger area than the inner first link plates.

4. The conveyor chain of claim 2 wherein the conveyor chain is a link chain.

5. The conveyor chain of claim 2 wherein the first and second link plates are connected to each other via connecting bolts.

6. The conveyor chain of claim 2 wherein spacer sleeves are present between the first and second link plates.

7. The conveyor chain of claim 2, wherein said larger area of each of the first link plates is arranged in a plane and the area is extending in two opposite directions beyond the area of the second link plates, these two opposite directions being perpendicular to a longitudinal extension of the conveyor chain.

8. The conveyor chain of claim 1, wherein the first inner link plates, the second outer link plates, and the second inner link plates are substantially identical.

9. The conveyor chain of claim 1, wherein said larger area of each outer first link plates is arranged in a plane and the area is extending in two opposite directions beyond the area of the outer second link plates, these two opposite directions being perpendicular to a longitudinal extension of the conveyor chain.

10. The conveyor chain of claim 1, wherein the connecting yokes each have a driver knob with a peripheral groove mounted thereto.

11. The conveyor chain of claim 1, wherein each of the inner first link plate, the inner second link plate, and the outer second link plate include a first upper surface, the first upper surfaces of each of the inner first link plate, the inner second link plate, and the outer second link plate are coplanar; and
wherein each of the inner first link plate, the inner second link plate, and the outer second link plate include a first lower surface opposite to the first upper surface, the first lower surfaces of each of the inner first link plate, the inner second link plate, and the outer second link plate are coplanar;
wherein the outer first link plates each include a second upper surface and a second lower surface that is opposite to the second upper surface, the second upper surface and the second lower surface are each non-coplanar with the first upper and the first lower surfaces respectively.

* * * * *